United States Patent [19]
Thull et al.

[11] Patent Number: 5,114,182
[45] Date of Patent: May 19, 1992

[54] MOTOR VEHICLE STEERING COLUMN

[75] Inventors: Wolfram Thull, Korntal-Münchingen; Hans-Heinrich Kohlmeier, Moensheim, both of Fed. Rep. of Germany

[73] Assignee: Dr. Ing. h.c.F. Porsche AG, Fed. Rep. of Germany

[21] Appl. No.: 648,817

[22] Filed: Feb. 1, 1991

[30] Foreign Application Priority Data

Feb. 9, 1990 [DE] Fed. Rep. of Germany ....... 4003942

[51] Int. Cl.[5] .............................................. B62D 1/18
[52] U.S. Cl. ....................................... 280/779; 74/493
[58] Field of Search ...................... 280/775, 777, 779; 74/492, 493

[56] References Cited

U.S. PATENT DOCUMENTS

| | | | |
|---|---|---|---|
| 2,549,925 | 4/1951 | Paton | 74/493 |
| 4,355,820 | 10/1982 | Kitagawa et al. | 280/779 |
| 4,362,319 | 12/1982 | Masaki et al. | 280/779 |
| 4,365,826 | 12/1982 | Iriyama | 280/779 |
| 4,671,536 | 6/1987 | Yoshimura | 280/779 |
| 4,682,788 | 7/1987 | Yoshimura | 280/779 |

FOREIGN PATENT DOCUMENTS

| | | |
|---|---|---|
| 443148 | 4/1927 | Fed. Rep. of Germany . |
| 485934 | 11/1929 | Fed. Rep. of Germany . |
| 2751068 | 6/1985 | Fed. Rep. of Germany . |
| 61-24669 | 2/1986 | Japan . |
| 960876 | 6/1964 | United Kingdom . |

Primary Examiner—Kenneth R. Rice
Attorney, Agent, or Firm—Evenson, Wands, Edwards, Lenahan & McKeown

[57] ABSTRACT

A steering column for a motor vehicle comprises a jacket tube, at which locally at least one bearing section is provided for the fastening of the jacket tube to a console mounted on the forward structure of the vehicle. In order to achieve a significant reduction of the shaking of the steering wheel also at critical speed ranges and in the case of a body of a convertible, the bearing section of the jacket tube, as viewed in the transverse direction, is displaceably arranged on the console. In addition, the jacket tube, by way of a supporting element, is connected to a vehicle body part having a high impedance in the transverse direction of the vehicle.

6 Claims, 4 Drawing Sheets

MOTOR VEHICLE STEERING COLUMN

BACKGROUND AND SUMMARY OF THE INVENTION

The present invention relates to a motor vehicle steering column, and more particularly to such a steering column in which the bearing section of a jacket tube, as viewed in the transverse direction, is slidably arranged on the console and the jacket tube is connected to a body part having a high impedance.

In a known steering column as shown in DE-PS 27 51 068, a jacket tube is firmly connected by fastening screws with the console disposed above it. A bearing section of the jacket tube, in this arrangement, is braced by the fastening screw against the lateral webs of the console or against washers. By way of this axial bracing in the transverse direction of the vehicle, the vibrations of the forward structure of the motor vehicle are transmitted to the steering column by the console so that, at certain critical speed ranges and particularly in the case of a body of a convertible, a shaking of the steering wheel will occur. Critical speed ranges are those at which forms of natural vibrations of the vehicle are caused, for example, by a wheel imbalance or by a rough road.

In order to reduce the shaking of the steering wheel, it has been suggested in U.S. Pat. No. 4,671,536 to support the bracket additionally by a support structure at the two exterior A-columns and at the center console. A first element of the support structure, in this situation, connects the two laterally exterior A-columns, whereas a second element, on the one side, is connected to the transmission tunnel and, on the other side to the adjacent A-column. Since, however, the two A-columns exercise relatively high vibrations in the transverse direction of the vehicle i.e. low impedance, also in this arrangement, the vibrations are transmitted by way of the support structure to the steering console into the steering column so that only a slight improvement of the shaking of the steering wheel can be achieved with this support structure.

It is an object of the present invention to take such measures on the body or on the steering column of the motor vehicle that a significant improvement of the shaking of the steering wheel is achieved also at critical speed ranges and in the case of a body of a convertible.

According to the present invention, this object has been achieved by slidably arranging the bearing section of the jacket tube, as viewed in the transverse direction, on the console. The jacket tube is connected to a body part having a high impedance via a supporting element.

Principal advantages achieved by the present invention are that, by means of the displaceable bearing of the steering column on the console as viewed in the transverse direction, an uncoupling of vibrations is effected between the steering column and the forward structure of the motor vehicle, whereby the vibrations of the forward structure of the motor vehicle are not transmitted to the steering column or the jacket tube by way of the console. In the transverse direction, the jacket tube or the steering column is connected by way of the supporting element only with a low-vibration or high impedance body part, whereby the shaking of the steering wheel is reduced significantly. Preferably, the supporting element is connected with a bearing section of the jacket tube and the transmission tunnel. By the uncoupling of the steering console and the jacket tube, the steering console can move in the transverse direction relative to the jacket tube. The fixing of the steering column in the longitudinal and the vertical direction takes place by the fastening screws of the console. However, the vibrations in these two directions are negligibly low.

BRIEF DESCRIPTION OF THE DRAWINGS

These and further objects, features and advantages of the present invention will become more apparent from the following detailed description of a presently preferred embodiment when taken in conjunction with the accompanying drawings wherein.

DETAILED DESCRIPTION OF THE DRAWING

Figure 1:
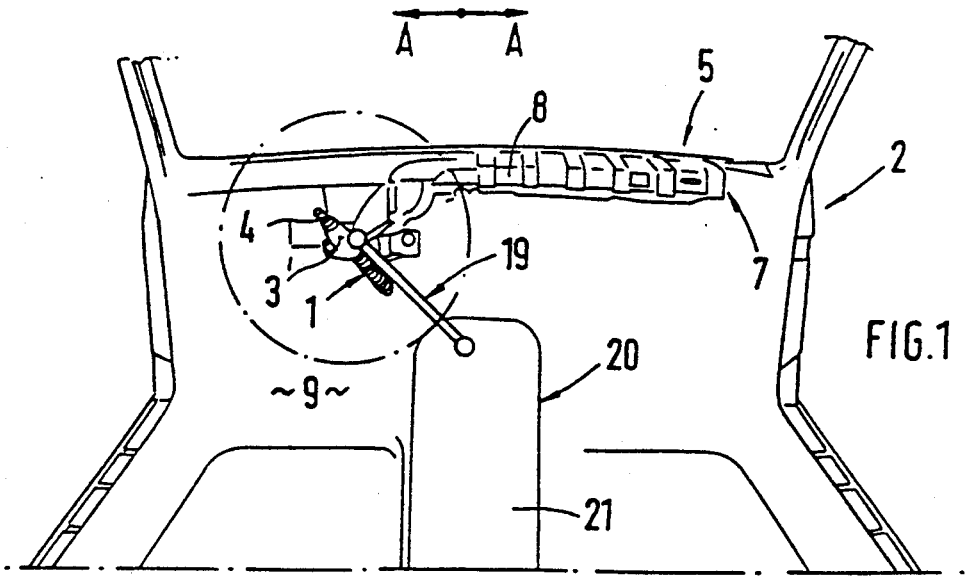
FIG. 1 is a plan view from the rear toward the front of a passenger compartment of a motor vehicle having a steering column.

FIG. 1 illustrates an energy-absorbing steering column 1 for a motor vehicle 2. The steering column 1 essentially comprises a jacket tube 3 which receives a steering shaft 4 in a rotatably disposed manner as shown more clearly in FIG. 2. The upper end of the steering shaft 4 is connected in a conventional manner with a steering wheel (not shown).

For the holding of the steering column I, a steering console 6 is provided on the forward structure 5 of the vehicle body and is fastened, preferably by welding, to a transverse member 8 extending approximately at the level of a dashboard. The console 6 projects into the passenger compartment 9 and extends essentially above the steering column 1 with an essentially U-shaped cross-section having upright lateral webs 10, 11. The console 6 is open in the downward direction. An upper wall 12 of the console 6 is also recessed at its free end 13 facing the passenger compartment 9.

Figure 2:
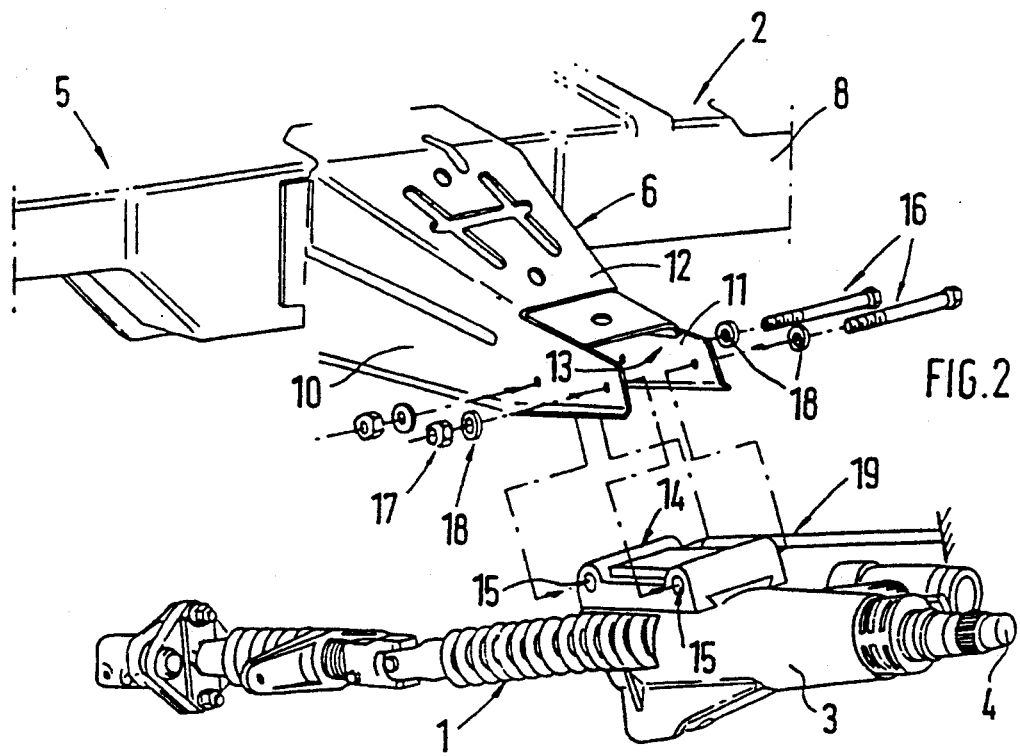
FIG. 2 is a lateral perspective diagonal view of the steering column shown in FIG. 1.

Between the two webs 10, 11, which extend in parallel to one another, a bearing section 14 of the jacket tube 3 is received. The bearing section 14 has at least one transversely extending passage bore 15 for the guiding-through of a connecting element 16. The connecting element 16 is formed by a screw bolt with an end-side nut or by a fastening screw. According to FIG. 2, two passage bores 15 for the connecting element 16, which are spaced with respect to one another, are provided on the bearing section 14. The bearing section 14 arranged locally in the upper area of the jacket tube 3 is constructed in one piece with the jacket tube 3 disposed underneath. However, the possibility also exists, as shown in FIG. 2, that the bearing section 14 is formed by a separate component which is connected with the jacket tube 3 disposed underneath e.g., by way of a dovetail guide.

For a significant reduction of the shaking of the steering wheel, the bearing section 14 of the jacket tube 3, viewed in the transverse direction designated by A—A, is displaceably disposed on the console 6. This is achieved by the fact that the bearing section 14 has a significantly smaller width B than the interior distance B1 between the two lateral webs 10, 11 of the console 6. According to FIG. 3, the steering column can move in the transverse direction A—A by approximately 5 to 10 mm relative to the console 6. The passage bore 15 of the bearing section 14 and the shaft diameter of the connecting element 16 are adapted to one another in such a manner that a sliding fit is achieved that is free of play. From the direction of the longitudinal center plane of the vehicle, the connecting elements 16 are guided through the webs 10, 11 of the console 6 and the passage bore 15, in which Case nuts 17 and possibly washers 18 are mounted on the exterior free ends. By way of the connecting elements 16 and the console 6, the steering column 1 is fixed in the longitudinal and in the vertical direction.

For the low-vibration holding of the steering column in the transverse direction A—A of the vehicle, a supporting element 19 is provided that is resistant to bending and connects the jacket tube 3 with a vehicle body element 20 that has relatively low vibrations in comparison to the forward structure 5 of the vehicle. The vehicle body element 20, which has a high impedance, according to FIG. I, is formed by the longitudinally extending transmission tunnel of the frame floor. Tests have shown that the transmission tunnel 21 vibrates significantly less in the transverse direction A—A of the vehicle than, for example, the forward structure of the vehicle 5, the end face wall and the exterior A-columns.

Figure 3:
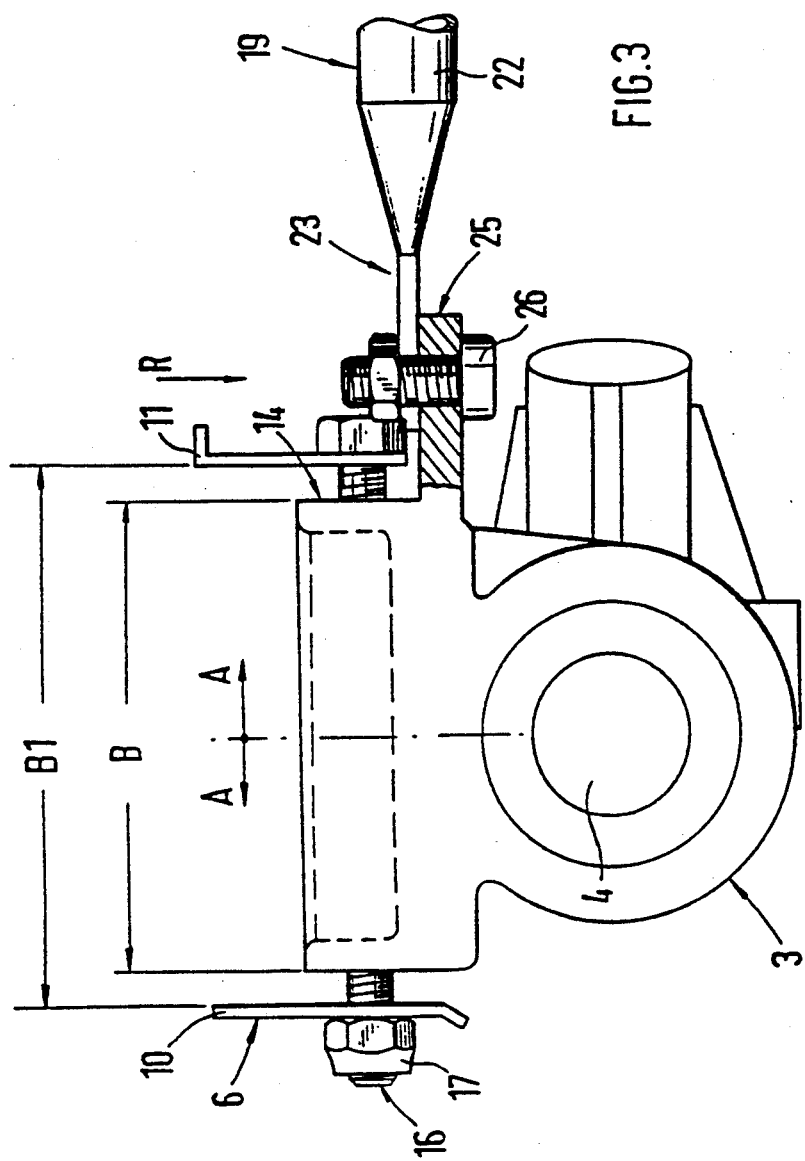
FIG. 3 is a partial sectional view in the longitudinal direction of the steering column.
Figure 4:
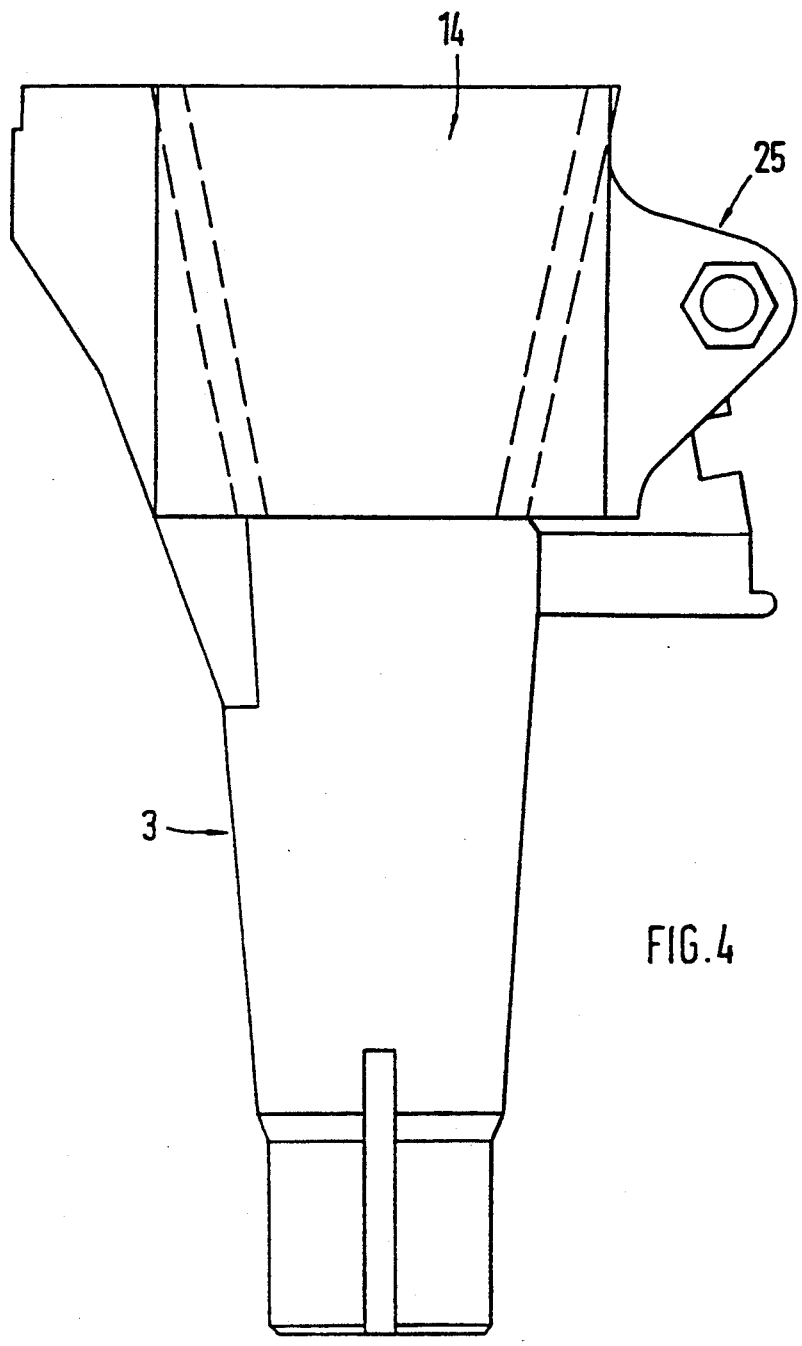
FIG. 4 is a view in the direction of the arrow R of FIG. 3 of the jacket tube of the steering column with the molded-on bearing section.

The supporting element 19 is formed by a tube 22, the end areas 23, 24 of which are bent and flattened. For the fastening of the upper end area 23 of the supporting element 19, a molded-on part 25 is provided which is directed toward the center console 21 and on which a flattened end area 23 of the tube 22 rests and to which it is fastened by a screwed connection. The molded-on part 25 projects over the console 6 toward the side. A screw 26 is guided from below through bores of the molded-on part 25 and of the end area 23 of the tube 22, and subsequently a nut is screwed onto the screw 26 from above as shown in FIG. 3.

The lower end area 24 of the supporting element 19 is firmly connected with the transmission tunnel 21 either directly or by a holder 27. The connection of the supporting element 19 with the transmission tunnel 21 takes place either at one of the side walls or at the upper boundary wall 28 of the transmission tunnel 21. A particularly advantageous connection of the supporting element with the vehicle body is achieved if the body-side fastening point of the supporting element 19 is situated in the area of a vibration node. Such a vibration node in the respective plane i.e. transverse direction of the vehicle, can be determined empirically.

Figure 5:
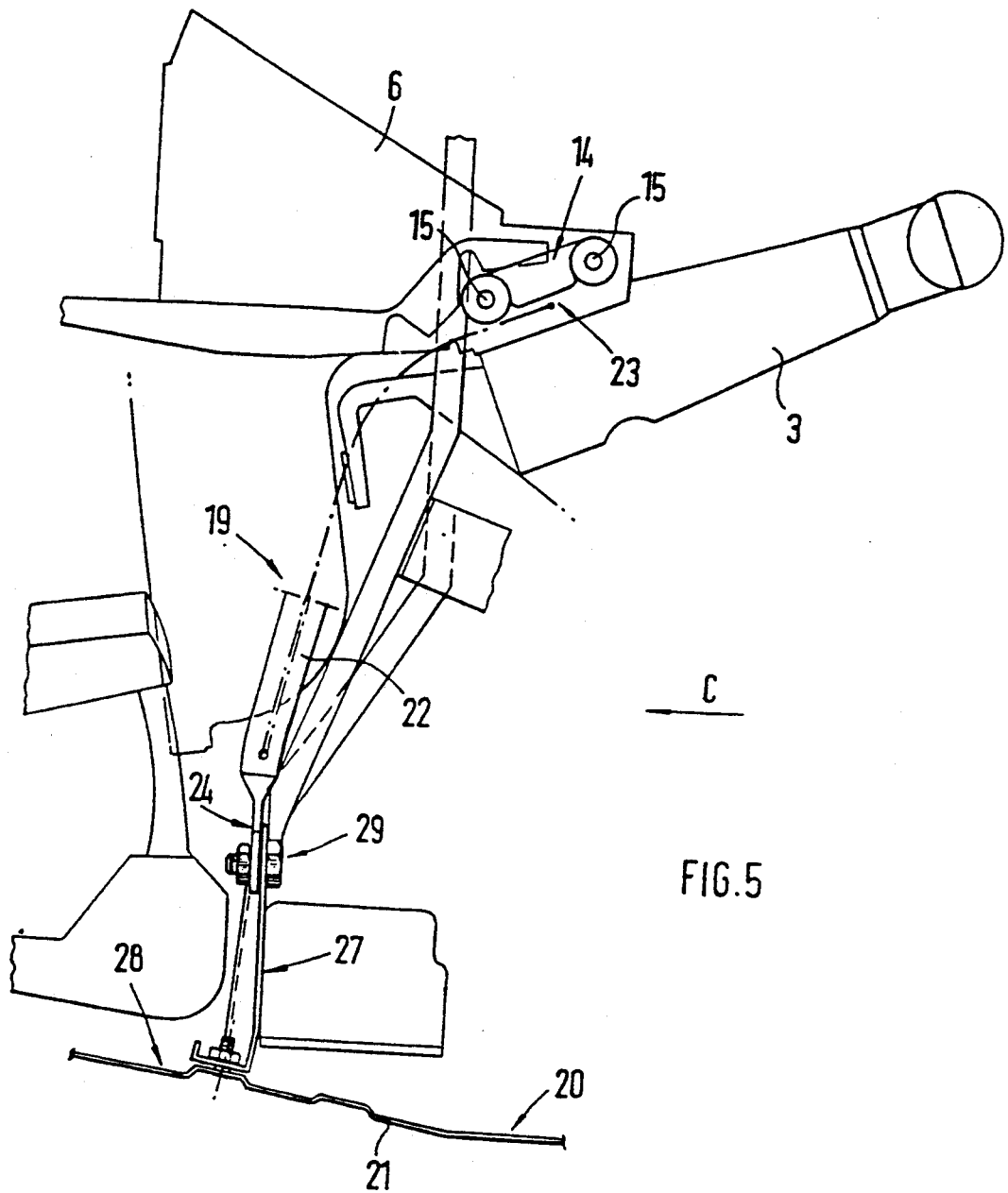
FIG. 5 is a lateral view of the steering column and of the supporting element in accordance with the present invention.

According to FIG. 5, a transversely extending holder 27 is mounted on the upper boundary wall 28 of the transmission tunnel 21. The lower end area 24 of the supporting element 19 is screwed to this holder 27. In this case, a screw 29 extends in the longitudinal direction of the vehicle. Corresponding to FIG. 5, the lower end 24 of the supporting element 19, viewed in the driving direction C, is situated slightly farther to the front than the upper end area 23. Between the two fastening points of the supporting element 19, this supporting element 19 has a curved shape shown by the dot-dash line in FIG. 5. However, the possibility also exists that the supporting element 19 has a straight shape between the end areas 23, 24 as shown in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A steering column for a vehicle and the like, comprising a jacket tube, at which locally at least one bearing section is provided for fastening thereof to a console mounted on the forward structure of the vehicle, wherein the bearing section of the jacket tube, as viewed in the transverse direction, is slidably arranged on the console, and the jacket tube, via a support, is operatively connected to a vehicle body part having a high impedance.

2. The steering column according to claim 1, wherein the vehicle body part is a transmission tunnel center console of the vehicle body.

3. The steering column according to claim 1, wherein the support is a tube.

4. The steering column according to claim 1, wherein an upper end area of the support is connected with the bearing section of the jacket tube.

5. The steering column according to claim 2, wherein on a side of the bearing section facing the center console, a molded-on part is provided on which a free top end area of the support rests and is fastened thereto by a screwed connection.

6. The steering column according to claim 1, wherein a lower end area of the support is connected with a holder which is placed onto an upper boundary wall of the vehicle body part.

* * * * *